(No Model.)
C. A. F. PETERS.
EARTH AUGER.
No. 352,001. Patented Nov. 2, 1886.
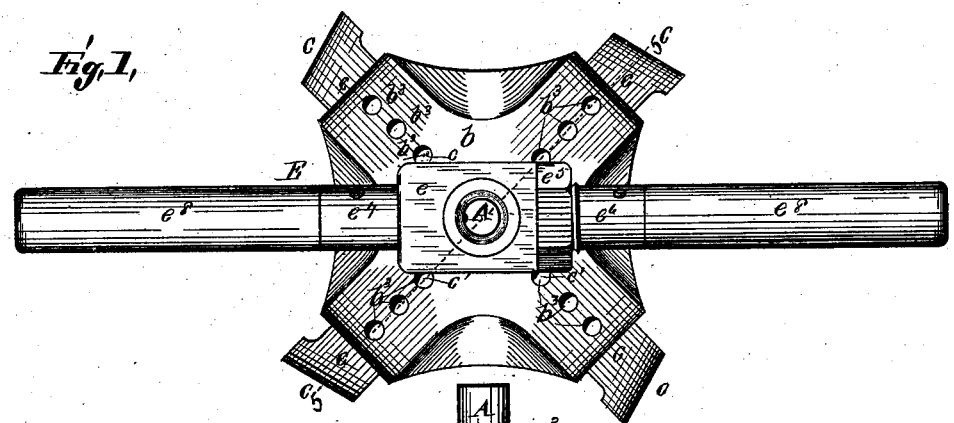
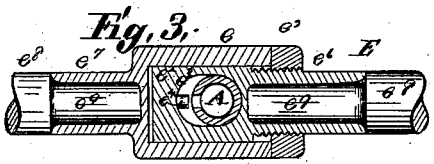
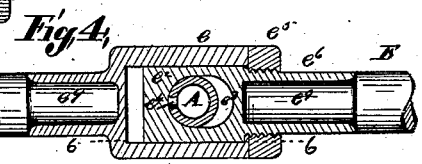
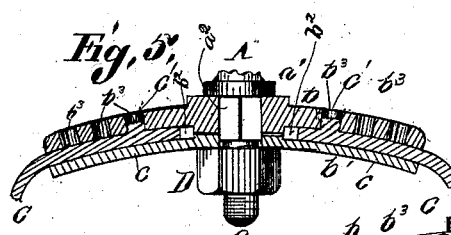
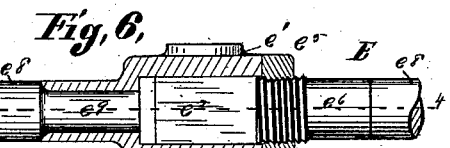
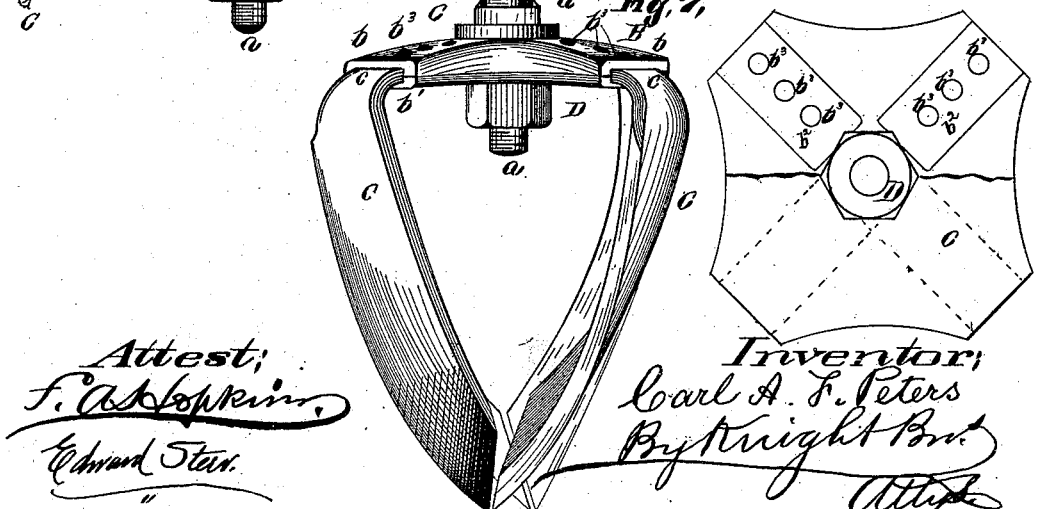
Attest:
F. A. Hopkins
Edward Stein
Inventor:
Carl A. F. Peters
By Knight Bro.
Attys

UNITED STATES PATENT OFFICE.

CARL A. F. PETERS, OF ST. LOUIS, MISSOURI, ASSIGNOR OF ONE-HALF TO JOHN LEDLIE, OF SAME PLACE.

EARTH-AUGER.

SPECIFICATION forming part of Letters Patent No. 352,001, dated November 2, 1886.

Application filed December 23, 1885. Serial No. 186,552. (No model.)

*To all whom it may concern:*

Be it known that I, CARL A. F. PETERS, of the city of St. Louis, in the State of Missouri, have invented a certain new and useful Improvement in Earth-Augers, of which the following is a full, clear, and exact description, reference being had to the accompanying drawings, forming part of this specification, and in which—

Figure 1 is a top view. Fig. 2 is a side view, with part of the stem broken out. Figs. 3 and 4 are sections at 3 4, Fig. 2, showing the handle disengaged from the stem in Fig. 3, and engaged thereto in Fig. 4. Fig. 5 is a detail axial section at 5 5, Fig. 1. Fig. 6 is a section at 6 6, Fig. 4, except that the nut is shown in axial section. Fig. 7 is an inside view of part of the upper plate of the head, and under view of part of the lower head-plate.

This is an improvement on the auger patented to me April 4, 1882, and numbered 256,039.

The improvement relates to the peculiar construction of the head and the adjustable handle, and the manner of attaching the head and handle to the stem.

A is the stem, which is shown as made of gas-pipe, but which may be made solid, if desired, and of any shape in transverse section. The stem has at the lower end a screw-threaded part, $a$, and a shoulder, $a'$.

The head B consists of a top plate or disk, $b$, and a bottom plate, $b'$, between which the blades C are firmly held, the disks being held tightly against the shanks $c$ of the blades by the same nut, D, by which the head is held upon the stem, the nut bearing against the under side of disk or plate $b'$, and the shoulder $a'$ against the top of the upper disk or plate, $b$. The part $a^2$ of the stem passing through the plate $b$ is square or otherwise prismatic to prevent the head turning on the stem. (See Fig. 5.)

The plate $b$ has grooves $b^2$, in which the shanks $c$ of the blades fit, and in which they are firmly held. Each shank has a steady-pin, $c'$, which enters any one of a number of holes, $b^3$, made in or through the plate $b$. (See Figs. 1, 2, and 5.) The purpose of this arrangement is to render the blades adjustable, so that the auger can be used to bore holes of different sizes. As represented, the auger is arranged for boring a hole of the smallest diameter of which it is capable.

By loosening the nut D the shanks are made capable of being drawn outward, and the steady-pin may be engaged in holes $b^3$ of an outer series to increase the diameter of the bore which is produced.

To insure that the points of the blades shall occupy about the same relative position in the various adjustments, the recesses or grooves $b^2$ are made with a curve, as seen in Fig. 5, and the shanks are curved in a similar manner to fit the grooves. By making the curves concentric with the points of the blades it will be seen that the position of the points will not be changed by the described adjustments.

The stem A is made with two or more holes, $a^3$, for the engagement of the handle. The central part of the handle E has bosses $e'$, which are bored for the passage of the stem directly through it. The part $e$ has a longitudinal mortise in which fits a tenon, $e^2$, which has an elongated hole, $e^3$, through which the stem passes. The elongation of the hole $e^3$ allows the tenon $e^2$ some movement in the mortise when the stem passes through it.

From the end of the hole $e^3$ extends a steady-pin, $e^4$, which may be made to enter either of the holes $a^3$ of the stem to hold the handle in position upon the stem. The tenon part $e^2$ is held in the clamping position by a nut, $e^5$, which screws on the socket $e^6$, and bears against the end of the mortised part $e$. The part $e$ has a socket, $e^7$, which, like the socket $e^6$, receives the tenon $e^9$ at the end of the wooden or metal part $e^8$ of the handle.

I have shown four blades, C; but they may be more or less in number.

It will be seen that the adjustable handle gives capacity for the use of the auger in boring deep holes, as its stem may be made quite long, and by the adjustment of the handle the operator can stand upon the surface of the ground, whatever the depth of the hole. When used for boring deep holes, it would be better to use a derrick for giving the vertical movements to the auger.

The auger may be used by hand or by machinery.

The grooves $b^2$ may be made in the plate $b'$, in place of in plate $b$. The pin-holes $b^3$ may also be made in either of these plates.

In place of the nut $e^5$, a wedge, eccentric, or other well-known device may be used to hold the pin $e^4$ in engagement with the stem, the device having bearing against the parts $e$ and $e^2$ or $e^6$.

I claim herein as my invention—

1. An earth-auger having radially-adjustable blades held between clamping-plates attached to the stem, substantially as set forth.

2. The combination of the two plates $b$ and $b'$, secured to the stem A, and blades C, having shanks secured between the plates, substantially as set forth.

3. The combination of curved blades C, with shanks $c$, extending inwardly from the concave sides of the blades, the holding-plates $b$ $b'$, and the stem secured in a central hole of the plates, substantially as set forth.

4. The combination of the two plates $b$ and $b'$, having curved bearings $b^3$, for the shanks of the blades C, the said blades and the stem A having a screw-threaded end, $a$, a shoulder, $a'$, and nut D, substantially as and for the purpose set forth.

5. The combination of the two plates $b$ $b'$, having, respectively, concave and convex faces presented toward each other, with curved grooves or mortises $b^3$, for the reception of the curved blade-shanks $c$, substantially as set forth.

6. The combination of the plates $b$ and $b'$, having grooves $b^2$ and pin-holes $b^3$, and the blades C, having curved shanks $c$, with steady-pins on the shanks constructed to enter the holes $b^3$, for the purpose set forth.

7. The combination of a stem, A, head B, consisting of the holding-plates $b$ $b'$, with grooves $b^2$ and holes $b^3$, and the blades C, having shanks $c$, with steady-pins $c'$, substantially as and for the purpose set forth.

8. The combination, with the stem A, having pin-holes, and the handle composed of parts $e$ and $e^2$ $e^6$, the latter, $e^2$ $e^6$, working within the former, and having an aperture, $e^3$, and pin $e^4$, substantially as and for the purpose set forth.

9. The combination of a stem, A, with holes $a^3$, handle with two parts, $e$ and $e^2$, through which the stem passes, the part $e^2$ having an aperture, $e^3$, and pin $e^4$, and the parts having sockets $e^6$ $e^7$, for the reception of the parts $e^8$ of the handle, and the socket $e^6$ having a nut, $e^5$, screwing thereon, for the purpose set forth.

CARL A. F. PETERS.

In presence of—
SAML. KNIGHT,
BENJN. A. KNIGHT.